(No Model.)
F. G. JOHNSON.
Dumping Scow.
No. 239,388. Patented March 29, 1881.
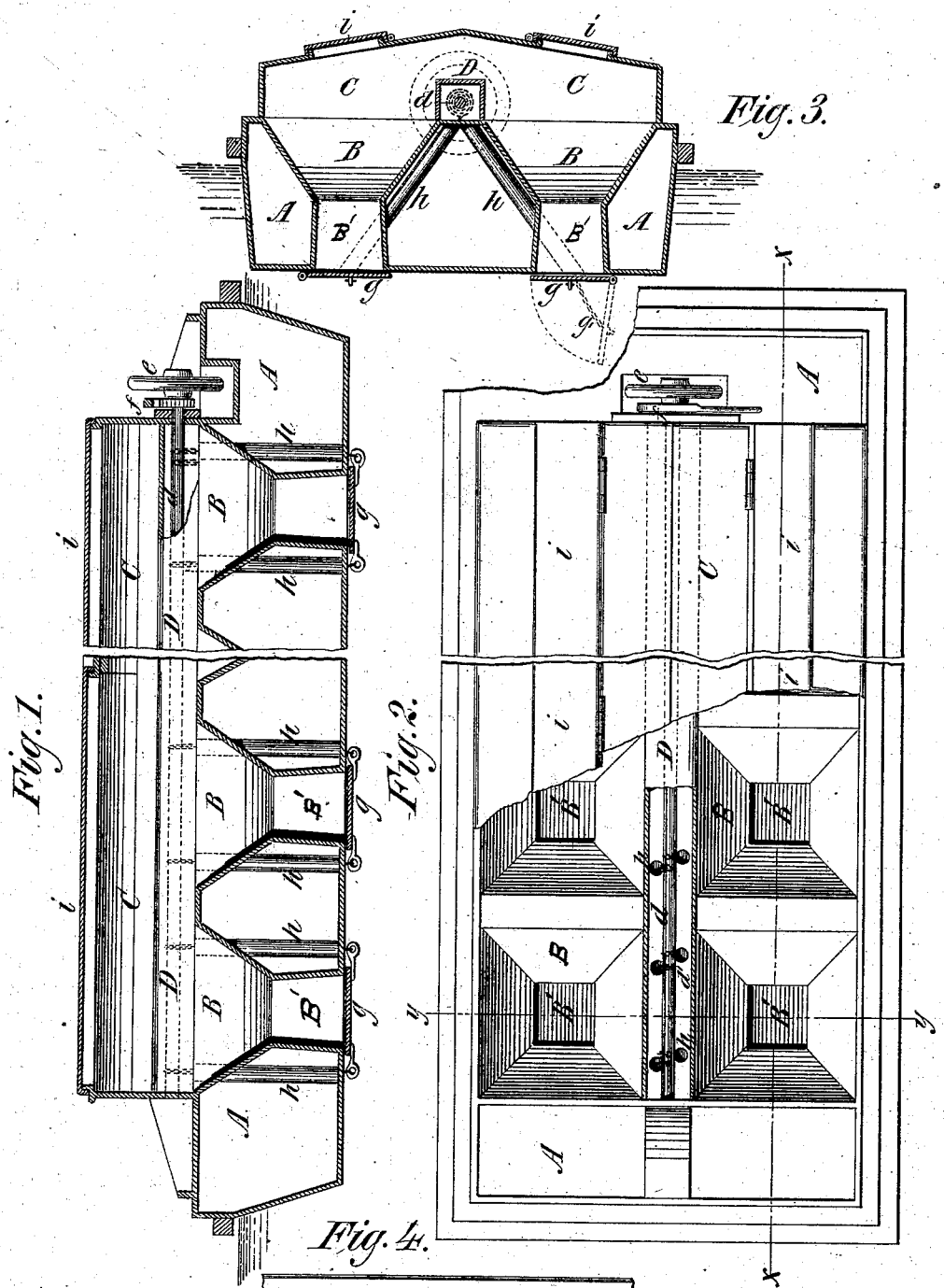
Witnesses:
J. B. Hyde
A. Stevens
Inventor:
Frank G. Johnson

UNITED STATES PATENT OFFICE.

FRANK G. JOHNSON, OF BROOKLYN, NEW YORK.

DUMPING-SCOW.

SPECIFICATION forming part of Letters Patent No. 239,388, dated March 29, 1881.

Application filed July 10, 1880. (No model.)

*To all whom it may concern:*

Be it known that I, FRANK G. JOHNSON, of the city of Brooklyn, in the county of Kings and State of New York, have invented certain new and useful Improvements in Scows, which improvements are fully set forth in the following specification.

My improvements relate to scows employed for transporting and unloading street-sweepings, garbage, offal, &c., my objective purpose being to construct such scows so that the load or materials carried may be covered or boxed in, protected from rains, winds, or the external air from the commencement of the loading to the discharge of the load automatically through the bottom, and protect the surrounding air from offensive odors, dust, or other unpleasantness. (See drawings.)

Figure 1 shows a vertical section of the vessel through $x\ x$ of Fig. 2, which represents a horizontal view or top of the scow, the roof-covering being in part cut away to show arrangement of the interior. Fig. 3 is a transverse vertical section of the scow through $y\ y$ of Fig. 2; and Fig. 4 is a partial view of the bottom, showing the exterior of two of the delivery-ports.

My improvements consist in a novel construction and arrangement of the several parts, so that the materials may be loaded with facility and be always inclosed, so as in a great measure to prevent rapid decomposition and the escape of noxious or poisonous gases, and be readily discharged without shoveling or other handling, the vessel being automatically emptied through a series of ports in the bottom, to insure rapid and equal delivery of the load from stem to stern.

The scow is strongly decked over at the ends and sides, as shown over A A. From the inner edge of the opening formed by this partial deck a strong upright curb of planks is raised and secured all around to a height of several feet above the deck, which space is covered entirely over by a strong roof, (seen over $c\ c$,) so made as to incline downward several inches from the central line fore and aft, as shown in the drawings. These two half-roofs are cut through from end to end, and the opening thus made on each side is covered by hinged doors, as shown at $i\ i$.

The hold proper of the scow is divided into two series of sections, about twelve feet square, more or less, as shown at B B, each section being occupied with a four-sided receptacle, the sides of which converge downward, by inclined planes, to a line about half the depth of the scow proper, and there terminate by openings about four feet square, more or less, to which a second casing is strongly secured, and extending downward to the bottom of the scow, forming outlet-chambers, with a relieving flare outward of several inches at the bottom, as shown at B' B', where the bottom of the scow is entirely cut away, which openings are covered by strong and hinged ports $g\ g$, outside the bottom of the scow, and opening outward therefrom, as shown by dotted lines $g'$, Fig. 3.

A longitudinal shaft, $d\ d$, is shown as rotating in proper bearings above the deck proper. Upon one end of this shaft $d$ is seen a hand-wheel, $e$, ratchet, and pawl, and along the line of the shaft, at proper intervals, two chains, $d'$, are shown as secured to the shaft and turning downward. Under the point at which the chains are made fast to the shaft iron tubes $h$ are represented fastened and passing obliquely downward right and left from the shaft into and through floatage-spaces to the bottom of the scow. These chains pass through the tubes, which conduct them to the delivery-ports $g$ without interfering with the load, being secured to the ports, to fasten them close or open them at will. D D show a box or casing extending over the entire length of the shaft $d$, protecting it from the loaded material.

The floatage of the loaded scow is shown to be ample by the vacant spaces seen at A A, as also by the cells left between the two series of inclined-plane receptacles.

In use the operation of the apparatus is as follows: The scow brought alongside the dumping-dock, with the doors $i\ i$ opened toward each other, the materials are thrown therein from cart above, and, falling, it first fills the outlet-chambers B', then the receptacles B, so that a good part of the load of my scow lies below the water-line and at the very bottom of the scow. The material finally fills into the cargo-room $c$ up to the very roof, the attendants taking care to properly distribute it evenly throughout. The doors $i\ i$ being then closed, nothing disagreeable presents itself to the senses in any degree. The scow is floated to the dumping-ground, and the pawl $f$ is raised from the ratchet, when the weight upon the ports $g$ will force them all downward, as in dotted lines $g'$, Fig. 3, releasing the material, which will discharge itself readily by the pitch of the inclined planes of the receptacles B, and when complete a few turns on the hand-wheel $e$ will again close the ports, secured by the ratchet, and make all ready for the return voyage.

I do not claim in a dumping-scow an inclined-plane receptacle having an outflaring delivery-chamber with an outlet port or ports actuated by a chain or chains around a longitudinal rotating shaft above the deck, as such devices for that purpose are well known; but What I do claim, and desire to secure by Letters Patent, is—

1. The combination, in a dumping-scow, of the double set of inclined hoppers having separate valved openings through the bottom, the central shaft, and chains leading from said shaft through inclined pipes to operate the valves, all substantially as set forth.

2. In a dumping-scow, the combination of the elevated stowage-chamber $c$, the inclined-plane receptacles B, the conducting-tubes $h$, and chains $d'$ with the hinged ports $g$, arranged and operated in the manner and for the purposes substantially as set forth.

3. In the outlet-ports of a dumping-scow, the combination of the shaft $d$, chains $d'$, and conducting-tubes $h$ with the stowage-chamber, substantially in the manner and for the uses described.

FRANK G. JOHNSON.

Witnesses:
   J. B. HYDE,
   A. STEVENS.